United States Patent Office 3,579,612
Patented May 18, 1971

3,579,612
SUSPENSION SYSTEM FOR PRODUCING HIGH IMPACT POLYSTYRENE
Arthur I. Lowell, Edison, N.J., assignor to Mobil Oil Corporation
No Drawing. Filed Sept. 3, 1968, Ser. No. 757,152
Int. Cl. C08f 1/11, 15/04
U.S. Cl. 260—880
2 Claims

ABSTRACT OF THE DISCLOSURE

In the preparation of high impact polystyrene by bulk prepolymerization of a rubber in a styrene followed by aqueous suspension polymerization using water-soluble suspending agents, excessive foaming and emulsification occurs. These difficulties are reduced by using in the suspension system a combination of a water-soluble hydroperoxide and a water-soluble metal formaldehyde sulfoxylate or its equivalent, together with the water-soluble suspension agent.

BACKGROUND OF THE INVENTION

Field of the invention

This invention relates to the suspension polymerization of styrene. It is more particularly concerned with the improved process for the suspension polymerization of a styrene rubber prepolymer, wherein foaming and emulsification are reduced.

Description of the prior art

As is well known to those familiar with the art, aqueous suspension systems are conventionally used media for the polymerization of a styrene rubber prepolymer to high impact polystyrenes. Such systems yield bead-foam polymers and afford good heat transfer, and control of exotherms.

Such systems contained a water-soluble protective colloid as a suspension agent and often an anionic surfactant and, in some cases, an electrolyte. Typical combinations of the prior art are acrylic acid/ethyl acrylate copolymer, calcium chloride, sodium bis(sulfonaphthyl)methane (U.S. 2,862,902; hydroxyethyl cellulose sodium dodecylbenzene sulfonate (Brit. 1,046,646); carboxymethyl cellulose (U.S. 3,346,520); and polyvinyl alcohol, sodium dodecylbenzene sulfonate, sodium chloride (Belg. 620,108). Excessive foaming and emulsification losses have been experienced, with attendent processing difficulties and economic losses. Propylene glycol has been added as a post-polymerization processing agent to reduce foaming in the carboxymethyl cellulose system (U.S. 3,346,520). A water-soluble chromate salt has been used in conjunction with hydroxyethyl cellulose to reduce emulsification losses (U.S. 3,280,089). In accordance with this invention, foaming and emulsification are minimized.

SUMMARY OF THE INVENTION

This invention provides, in a process for polymerizing styrene-rubber prepolymer containing a free-radical initiator, with agitation, in suspension in an aqueous medium containing a water-soluble suspension agent, the improvement that comprises adding to the aqueous suspension a mixture of a water-soluble hydroperoxide and a water-soluble metal formaldehyde sulfoxylate or its equivalent.

DESCRIPTION OF SPECIFIC EMBODIMENTS

The improved operation of this invention is appied to the two stage polymerization of a solution of a rubber in a styrene reactant. The rubber used in making the thermoplastic compositions can be either a normal rubber such as pale crepe, or preferably synthetic rubber, for instance an SBR synthetic rubber (e.g., "cold SBR rubber"), a copolymer of butadiene and styrene which is usually derived from butadiene and styrene in proportions lying between 50:50 and 95:5 by weight and made by an emulsion process. Polybutadiene rubber (100% butadiene) can also be used. Elastomers produced from monovinyl-aromatic compounds other than styrene or dienes other than butadiene are suitable providing of course that such rubbers are sufficiently monomer-soluble, i.e., the rubbers used are starting materials should be substantially gel-free so as to dissolve in the monovinyl-aromatic compound.

The amount of rubber used is generally between about two and about fifteen percent by weight of the styrene reactant. The optimum depends on the type of rubber used and on the properties required in the final high impact polymer.

The styrene reactant is a monovinyl benzene compound or a derivative thereof. The compositions contemplated include styrene and its polymerizable derivatives, such as the lower alkyl-substituted styrenes and chlorine-substituted derivatives. Typical styrene reactants are styrene, α-methylstyrene, p-methylstyrene, m-chlorostyrene, ortho-chlorostyrene; para-chlorostyrene; 2,6-dichlorostyrene; 2,4-dichlorostyrene; 2,5 - dichlorostyrene; 2,3 - dichlorostyrene; 3,4 - dichlorostyrene; the higher polychlorostyrenes; ortho-methylstyrene; meta-methylstyrene; ethyl vinyl benzenes; 4 - vinyl pyridine; methylmethacrylate; vinyl naphthalene, the mixtures of these with each other or with styrene, or other copolymerizing material such as acrylonitrile; fumaronitrile; maleimide; butylacrylate; divinylbenzene; isopropenylbenzene; polychloro ring-substituted isopropenylbenzene; para-diisopropenyldiphenyl; para-vinyldiphenyl; methacrylonitrile; acrylic acid; butadiene; isoprene; 2,3-dimethylbutadiene; 2-chlorobutadiene-1,3; vinylidene chloride. Stylrene is preferred in the prepolymerization stage.

The desired amount of rubber is dissolved in the styrene monomer reactant. Then, the resultant solution is subjected to bulk polymerization. The bulk polymerization is carried out in the presence of catalysts soluble in the vinyl monomer which generate free radicals, such as peroxy or azo compounds. Typical catalysts that are utilizable are benzoyl peroxide, di-t-butyl-peroxide, dicumyl peroxide, t-butyl peracetate, t-butyl perbenzoate, and azoisobutyronitrile.

The amount of catalysts used in the first stage can be between about 0.001 and about 0.09 percent by weight, with additional catalysts being added in the second stage suspension polymerization. Preferably, however, larger amounts of catalysts can be added in the first stage and none in the second stage. A preferred combination is 0.05 percent benzoyl peroxide and 0.15 percent dicumyl peroxide, by weight of monomer. The dicumyl peroxide acts chiefly in the second stage, because of its higher activation temperature. If desired, a compound functioning as polymerization modifier, such as tertiary dodecyl mercaptan, may be added. Also, there may be added other materials, for example plasticizers or lubricants such as dibutyl sebacate, dioctyl phthalate, butyl stearate, stearic acid, or white oil.

In the bulk polymerization, the solution of rubber in styrene is gently agitated and heated to a polymerization temperature. This is usually between about 50° C. (122° F.) and about 150° C. (302° F.), preferably between about 80° C. (176° F.) and about 100° C. (212° F.). During polymerization gently agitation is continued until twenty to forty percent of the styrene reactant is polymerized. The total solids content at the end of the first stage is between about twenty to forty-five percent by weight.

The polymerization of the prepolymer is completed in an aqueous suspension containing a protective colloid suspension agent. Typical suspension agents utilizable are polyvinyl alcohol, hydroxyethyl cellulose, and carboxymethyl cellulose. Generally, the amount of suspension agent will be between about 0.05 percent and about 5 percent or more of the weight of the total suspension, and preferably between about 0.1 percent and about 1 percent.

The "extender" used in this invention is a mixture of a water-soluble hydroperoxide and a water-soluble metal formaldehyde sulfoxylate or its equivalent. The preferred hydroperoxide component is t-butylhydroperoxide. However, other water-soluble hydroperoxides can be employed, such as cumene hydroperoxide, diisopropylbenzene hydroperoxide, p-methane hydroperoxide, and water-soluble aldehyde and ketone peroxides containing hydroperoxide groups. The amount of the water-soluble hydroperoxide used will, in general, be between about 3 p.p.m. and about 50 p.p.m., based upon the weight of the total suspension system.

The preferred water-soluble metal formaldehyde sulfoxylate is sodium formaldehyde sulfoxylate. Other water-soluble metal formaldehyde sulfoxylates can be used, however, such as potassium and zinc formaldehyde sulfoxylates. In lieu of the formaldehyde sulfoxylates, one can use water-soluble sulfites, water-soluble bisulfites, and water-soluble aromatic sulfinates. The amount of water-soluble metal formaldehyde sulfoxylate used will be between about 5 p.p.m. and about 120 p.p.m., based upon the weight of the total suspension system.

Preferably, the water-soluble hydroperoxide component is added to the well-stirred batch of prepolymer suspension in water containing suspension stabilizer, at the transfer temperature, usually at about 88° C. (190° F.). It is possible, however, to add the hydroperoxide at temperatures as low as about 140° F.

The addition of the water-soluble metal formaldehyde sulfoxylate (or its equivalent) will ordinarily immediately follow the addition of the water-soluble hydroperoxide component, preferably at about 190° F. In the alternative, it can be added incrementally as the polymerization proceeds, but the former procedure is preferred.

It is preferable, for ease in handling, to add the extender components in the form of concentrated solutions, using the minimum amount of water needed to maintain these materials in solution.

The suspension polymerization of the prepolymer styrene and similar monomers and comonomers can be carried out at temperatures of about 88° C. (190° F.), the transfer temperature, i.e., the temperature at which prepolymer is transferred to the aqueous suspension. The suspension system of this invention, however, is stable at temperatures of as high as 130° C. (265° F.) and it preferred to operate at the higher temperatures. The advantages of higher polymerization temperature are an accelerated polymerization rate, complete conversion of monomer, and elimination of residual peroxide.

The following examples demonstrate the effectiveness of the process of this invention (Examples 1 and 2), in comparison with typical prior art processes (Examples 3 and 4). The procedure used in all the examples was as follows:

A mixture of styrene and rubber, containing lubricant and peroxide initiators, was placed in a stainless steel reactor (5 gal.) equipped with an anchor agitator. The mixture was heated at 210° F. with agitation (90 r.p.m.) for 4 hours to effect partial polymerization. A small amount of t-dodecyl mercaptan was added after the 3¾ hours.

The partially polymerized prepolymer was then pumped into an aqueous suspension medium contained in a glass lined reactor (10 gal.) fitted with a 3-arm retreating blade agitator. The suspension medium was maintained at 190° F. and was agitated during the transfer of prepolymer. After transfer was completed and prepolymer was suspended, the suspension was held at 190° F. for about 5 minutes, before adding the extender (t-butyl hydroperoxide and sodium formaldehyde sulfoxylate). Thereafter, the suspension was heated to 265° F. and was held at that temperature for 12 hours to complete the polymerization.

In the table, the components and the amounts thereof used in each example are set forth. Also given are the observations on foaming and emulsification. It will be noted that the process of this effects a marked drop in the amount of foaming and a significant decrease in emulsification loss.

TABLE

| Example | 1 | 2 | 3 | 4 |
|---|---|---|---|---|
| Recipe: | | | | |
| Styrene (g.) | 12,000 | 14,000 | 10,000 | 10,000 |
| Rubber (g.) [1] | 600 | 700 | 500 | 500 |
| Butyl stearate (g.) | 240 | 280 | 200 | 200 |
| t-Dodecyl mercaptan (g.) | 7.2 | 8.4 | 6 | 6 |
| Benzoyl peroxide (g.) | 6.0 | 7.0 | 5 | 5 |
| Dicymyl peroxide (g.) | | | | |
| Water (g.) | 15,000 | 15,000 | 13,140 | 13,140 |
| Elvanol 50-42 (g.) [2] | 14.4 | 15 | 25 | 25 |
| Sodium chloride (g.) | 72 | 75 | 29 | 29 |
| Nacconol 90F (g.) [3] | | | 7.2 | 7.2 |
| t-Butyl hydroperoxide (p.p.m.) | 75 | 50 | | |
| Sodium formaldehyde sulfoxylate (p.p.m.) | 75 | 50 | | |
| Agitation rate during suspension step (r.p.m.) | 120 | 200 | 150 | 120 |
| Foam development | Low | Low | Heavy | Heavy |
| Emulsification loss (percent) | 1.7 | 1.9 | 5.9 | 6.7 |

[1] Polybutadiene rubber (Plioflex 5001).
[2] Polyvinyl alcohol.
[3] Sodium dodecylbenzene sulfonate.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. The process that comprises bulk polymerizing styrene containing from about two to fifteen percent dissolved rubber in the presence of a monomer soluble free-radical catalyst until up to about 40% of the styrene monomer is polymerized to form a prepolymer, followed by suspending the prepolymer in an aqueous medium containing from about 0.05% to about 5% of the suspension of a protective colloid and as an extender, a mixture of from 3 to about 50 parts per million of total suspension of a water-soluble hydroperoxide and from 5 to 120 parts per million of a water-soluble metal formaldehyde sulfoxylate and completing the polymerization.

2. The process of claim 1, wherein the rubber is polybutadiene rubber, the water-soluble agent is polyvinyl alcohol, the water-soluble hydroperoxide is t-butyl hydroperoxide, and the metal formaldehyde sulfoxylate is sodium formaldehyde sulfoxylate.

References Cited

UNITED STATES PATENTS

| 3,047,534 | 7/1962 | Dyer et al. | 260—880 |
| 3,284,542 | 11/1966 | Carrock et al. | 260—880 |
| 3,449,311 | 6/1969 | Lowell | 260—93.5 |
| 1,609,367 | 12/1926 | Kulas et al. | 260—51 |
| 2,933,520 | 4/1960 | Bader | 260—51 |

JAMES A. SEIDLECK, Primary Examiner

U.S. Cl. X.R.

260—4, 93.5